May 24, 1966    R. B. SEAMAN    3,252,347
CHAIN TENSIONER DEVICES
Filed July 27, 1964
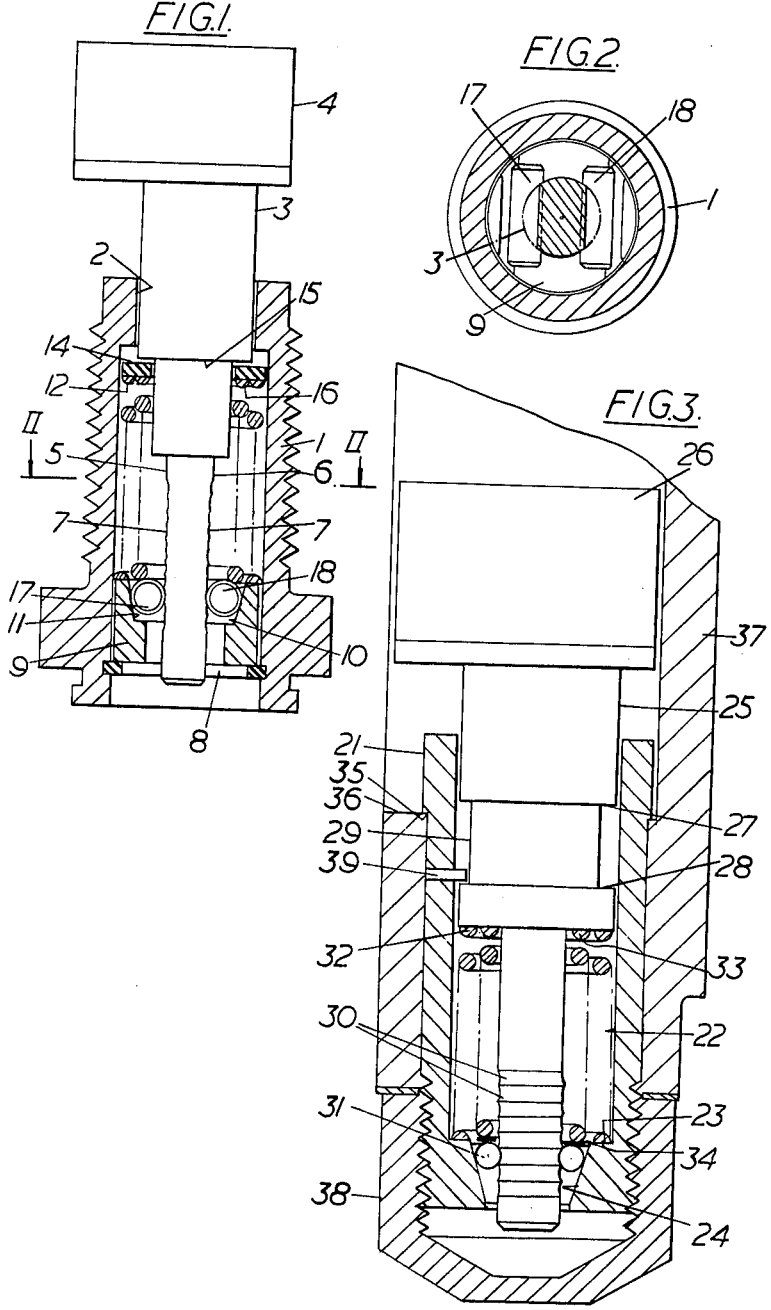
Inventor
*Robert Brian Seaman*
BY
*W.S. Pettigrew*
Attorney

United States Patent Office 3,252,347
Patented May 24, 1966

3,252,347
CHAIN TENSIONER DEVICES
Robert Brian Seaman, Bedford, England, assignor to General Motors Corporation, Detroit, Mich., a corporation of Delaware
Filed July 27, 1964, Ser. No. 385,384
Claims priority, application Great Britain, July 31, 1963, 30,369/63
4 Claims. (Cl. 74—242.8)

This invention relates to chain tensioner devices by which the slack in a chain or belt may be automatically taken up during operation.

In an automatic chain or belt tensioner device according to the invention a pair of telescopically interengaged members, of which one is adapted to be secured to a fixed part and the other is adapted to engage the chain, are pressed apart by a spring, and two or more roller elements are pressed by a further spring into a tapered recess formed by transverse flutes on one member and an inclined surface on the other so that, depending on the direction of relative movement of the members, the roller elements either wedge in the recess and resist such movement or roll freely in the recess to permit the movement.

In one embodiment, the flutes may be on each of two parallel longitudinal surfaces on the inner of the interengaged members, and the outer member may have two inclined plane surfaces which respectively form with the fluted surfaces of the inner member a pair of tapered recesses each receiving a cylindrical roller element.

Alternatively, the flutes may be circumferential on the inner member and the inclined surface may be a tapered bore on the outer member, with a plurality of spherical roller elements or balls being located in the tapered annular recess thereby formed.

Preferably, the inner member carries a pad for engagement with the chain, and the outer member is screw-threaded into a fixed part of the apparatus on which the chain operates.

The scope of the invention is defined by the appended claims; and the invention and the method by which it is to be performed are hereinafter particularly described with reference to the accompanying drawings in which:

FIGURE 1 is a sectional elevation of one embodiment of the chain tensioner device;

FIGURE 2 is a section on the line II—II of FIGURE 1; and

FIGURE 3 is a sectional elevation of a second embodiment of the chain tensioner device.

In the embodiment of the invention shown in FIGURES 1 and 2 the chain tensioner device comprises an externally threaded sleeve 1 having at one end thereof a reduced coaxial bore 2 in which is slidably mounted a pin 3 the outer end of which carries a pad 4 of hard rubber or other tough antifriction material. The end of the pin 3 within the sleeve 1 has thereon a pair of opposed parallel surfaces 5, 6 each formed with a plurality of transverse flutes 7.

Located within the open end of the sleeve 1 by means of a split ring 8 is a collar 9 having a pair of diametrically opposed plane surfaces 10, 11 which are inclined to the axis of the sleeve 1 so as to form an aperture which widens towards the end of the sleeve 1 having the bore 2 therein.

A helical spring 12 mounted within the sleeve 1 and around the pin 3 bears at one end against the collar 9 and at its other end against a washer 14 which in turn bears on a shoulder 15 on the pin 3. A second helical spring 16 mounted coaxially within the spring 12 bears at one end against the washer 14 and at its other end against a pair of cylindrical rollers 17, 18 which are located and retained by the second spring 16 in the narrower portion of a pair of recesses formed between the fluted portions 7 of the pin 3 and the inclined surfaces 10, 11 on the collar 9.

In use, the threaded sleeve 1 is screwed into an opening on a fixed part of the mechanism on which the chain tensioner device is to operate, the pad 4 on the end of the pin 3 engaging the chain or belt (not shown) so as to taken up the slack therein under the outward bias by springs 12, 16 on pin 3. Any slack which develops during the use of the chain is automatically taken up by outward movement of the pin 3, the rollers 17, 18 merely riding freely towards the wider end of the tapered openings during such outward movement and progressively moving from one flute 7 to an adjacent flute.

Movement of the pin 3 in the opposite direction, for example when the chain to be tensioned thrashes back, or when the chain contracts as the result of changes in temperature, is permitted, at most, to only the limited extent of a rolling of rollers 17, 18 each in a respective single flute before they wedge in the tapered openings and lock the pin 3 against further movement relative to the sleeve 1.

The second embodiment of the invention shown in FIGURE 3 is basically the same as that shown in FIGURES 1 and 2 but in this case a plurality of balls are employed instead of the cylindrical rollers 17, 18 of the first described embodiment.

The chain tensioner device shown in FIGURE 3 comprises an externally threaded sleeve 21 having therein a cylindrical bore 22 and at one end an annular shoulder 23 the inner periphery of which forms one end of a conically tapered opening 24. Slidably mounted in the bore 22 is a pin 25 the outer end of which carries a pad 26. The end portion of the pin 25 adjacent the pad 26 is formed with a pair of axially spaced shoulders 27, 28 at either end of a reduced diameter portion 29 of the pin, and the other end portion of the pin 25 is of further reduced diameter and has thereon a plurality of circumferential flutes or grooves 30.

A plurality of balls 31 are arranged around the pin between the flutes 30 and the tapering surface 24.

A helical spring 32 abuts at one end against the opposite surface of the shoulder 28 on the pin 25 and at its other end against the shoulder 23 in the sleeve 21; and a further helical spring 33 abuts at one end against the opposite face of the shoulder 28 on pin 25 and at its other end against a washer 34 interposed between the end of the spring 33 and the balls 31.

The sleeve 21 is formed at one end with an external shoulder 35 by which it is seated against a shoulder 36 at one end of a bore in a fixed part 37 of the mechanism on which the tensioner device is to operate, the sleeve 21 being secured by a cap nut 38 which is screwed on to the threaded end of the sleeve 21 in abutment with the end of the bore in the fixed part 37.

A pin 39 fixed in the wall of the sleeve 21 is engaged by the shoulder 28 to limit the axial movement of the pin 25 under the pressure of the springs 32, 33.

The operation of this embodiment of the tensioner device is the same as in the first embodiment described, the balls 31 wedging in the tapering annular space between surface 24 and the flutes 30 to limit the axial movement of the pin 25 in one direction but permitting progressive advancement of the pin in the opposite direction, under the pressure of the springs 32, 33 so as to take up slack in the chain engaged by the pad 26.

I claim:

1. A chain tensioner device, comprising in combination, a housing member having a central bore, a tensioner member telescopically received within said housing member and including means external of said housing for engagement with a chain to be tensioned, means forming at one end of said housing a tapered counterrecess coaxial with said central bore and opening at its larger dimension thereto, said tensioner member including a reduced end portion received within said counterrecess and provided with a series of flutes opposing the tapered wall thereof, a plurality of roller elements each of a shape and size to conform closely to each of said flutes and being received between said reduced end portion and the tapered wall of said counter-recess, the larger dimension of said counterrecess being sized relative to said reduced end portion to permit transfer of said roller elements between successive flutes upon movement of said tensioner member telescopically outwardly of said housing, and coil spring means surrounding said tensioner member within said housing member and bearing at one end thereof on said tensioner member and at the other end thereof on said roller elements to bias said tensioner member telescopically outwardly of said housing member and to retain said roller elements within said counterrecess for wedging therein under movement of said tensioner member telescopically inwardly of said housing.

2. A chain tensioner device as recited in claim 1 wherein said counterrecess forming means includes a pair of opposed plane wall surfaces merging with one end of said central bore, and wherein said roller elements are cylindrical.

3. A chain tensioner device as recited in claim 1 wherein said counterrecess is frusto-conical and wherein said roller elements are balls.

4. A chain tensioner device as recited in claim 1 wherein said central bore is open at each end and wherein said recess forming means includes a member insertable into one end of said bore and retained therein, and wherein said coil spring means includes a first spring bearing at one end thereof on said tensioner member and at the other end thereof on said insertable member and a second spring within said first spring bearing at one end thereof on said tensioner member and at the other end thereof on said roller element.

References Cited by the Examiner

UNITED STATES PATENTS

| 1,673,762 | 6/1928 | Chapman | 74—242.11 |
| 1,783,987 | 12/1930 | Thompson | 74—242.11 |
| 2,284,821 | 6/1942 | Heaslet | 74—242.14 |
| 2,329,182 | 9/1943 | Boynton | 74—527 |
| 2,703,019 | 3/1955 | Burawoy | 74—242.11 |
| 2,744,419 | 5/1956 | Chayne. | |
| 2,791,914 | 5/1957 | Cornelius | 74—527 |
| 3,164,030 | 1/1965 | Fodrea et al. | 74—531 X |

FOREIGN PATENTS

| 849,938 | 9/1952 | Germany. |
| 511,064 | 9/1939 | Great Britain. |

DAVID J. WILLIAMOWSKY, *Primary Examiner.*

DON A. WAITE, *Examiner.*

JAMES A. WONG, *Assistant Examiner.*